US 009229788B2

(12) United States Patent
Toub et al.

(10) Patent No.: US 9,229,788 B2
(45) Date of Patent: Jan. 5, 2016

(54) PERFORMING A WAIT OPERATION TO WAIT FOR ONE OR MORE TASKS TO COMPLETE

(75) Inventors: Stephen H. Toub, Seattle, WA (US); Joseph E. Hoag, Bothell, WA (US); Huseyin S. Yildiz, Kenmore, WA (US); Danny S. Shih, Seattle, WA (US); Mike Liddell, Seattle, WA (US); John Duffy, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 907 days.

(21) Appl. No.: 12/732,552

(22) Filed: Mar. 26, 2010

(65) Prior Publication Data

US 2011/0239217 A1    Sep. 29, 2011

(51) Int. Cl.
*G06F 9/46*     (2006.01)
*G06F 9/52*     (2006.01)

(52) U.S. Cl.
CPC ...................... *G06F 9/522* (2013.01)

(58) Field of Classification Search
CPC ................. G06F 9/4843; G06F 9/52
See application file for complete search history.

(56) References Cited

U.S. PATENT DOCUMENTS

| 5,835,763 | A | 11/1998 | Klein |
| 7,249,355 | B2 | 7/2007 | O'Neill |
| 2009/0070773 | A1 | 3/2009 | Depoutovitch et al. |
| 2009/0157817 | A1 | 6/2009 | Williamson |

OTHER PUBLICATIONS

Useful Abstractions Enabled with ContinueWith Stephen Toub, Jul. 24, 2008.*
CancellationToken Structure, Sep. 9, 2005.*
Deshpande, Mangesh, "SQL Server SSIS and Replication", Retrieved at << http://blogs.msdn.com/mangeshd/archive/2008/02/08/if-you-are-using-sql-server-notification-services-2-0-you-can-get-error-4085-the-number-of-waithandles-must-be-less-than-or-equal-to-64.aspx >>, Feb. 8, 2008, pp. 3.
"WaitHandles Must be Less Than or Equal to 64—Missing Documentation", Retrieved at << http://www.dotnetmonster.com/Uwe/Forum.aspx/dotnet-clr/1971/WaitHandles-must-be-less-than-or-equal-to-64-missing-documentation >>, Dec. 25, 2008, pp. 5.
Johnsontroye, "WaitHandle Exceptions and Work Arounds", Retrieved at << http://www.anothercodesite.com/Blog/default.aspx?tag=/asynchronous&page=2 >>, Nov. 11, 2008, pp. 7.
"Parallel Programming with .Net: .Net 4 Cancellation Framework", Retrieved at << http://blogs.msdn.com/pfxteam/archive/2009/05/22/9635790.aspx >>, May 22, 2009, pp. 1-20.
Bar, Ami, "Smart Thread Pool", Retrieved at << http://www.codeproject.com/KB/threads/smartthreadpool.aspx >>, Feb. 13, 2006, pp. 18.
Eric, "New TechBlog();", Retrieved at << http://www.randomtree.org/eric/techblog/ >>, Jul. 19, 2006, pp. 6.

\* cited by examiner

*Primary Examiner* — Mengyao Zhe
(74) *Attorney, Agent, or Firm* — Kevin Sullivan; Raghu Chinagudabha; Micky Minhas (57) ABSTRACT

A method of performing a wait operation includes creating a first plurality of tasks and a continuation task. The continuation task represents a second plurality of tasks. The continuation task and each of the tasks in the first plurality have an associated wait handle. The wait handles for the first plurality of tasks and the continuation task are stored in an array. A wait operation is performed on the array, thereby waiting for at least one of the tasks in the first and second pluralities to complete.

19 Claims, 10 Drawing Sheets

PERFORMING A WAIT OPERATION TO WAIT FOR ONE OR MORE TASKS TO COMPLETE

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that, for example, the same logical operation can utilize many processors at one time to thereby deliver better performance as more processors are added to the computers on which such software runs.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Some systems provide support for waiting on a limited number of wait handles (and correspondingly waiting on a limited number of tasks). However, given the fine-grained nature of tasks, it is often the case that more than this limited number of tasks will be created, thus hitting the limit imposed by the system. One embodiment provides the ability to wait on any number of tasks.

One embodiment provides a method of performing a wait operation, which includes creating a first plurality of tasks and a continuation task. The continuation task represents a second plurality of tasks. The continuation task and the tasks in the first plurality each have an associated wait handle. The wait handles for the first plurality of tasks and the continuation task are stored in an array. A wait operation is performed on the array, thereby waiting for at least one of the tasks in the first and second pluralities to complete.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides an application for any-or-all waiting on tasks, but the technologies and techniques described herein also serve other purposes in addition to these. In one implementation, one or more of the techniques described herein can be implemented as features within a framework program such as the Microsoft®.NET Framework, or within any other type of program or service that handles parallel operations in programs.

Data parallel systems typically operate by partitioning input data into disjoint subsets (partitions) so that independent tasks of execution may process the separate subsets in isolation. The partitions may be processed in parallel by multiple processors to generate a plurality of output sets. The output sets are merged back into a merged output set. The execution of the same query by multiple processors operating in parallel on different partitions of data may be referred to as data parallelism, since the input data is being divided among the processors. Another form of parallelism is referred to as task parallelism, in which a set of different operations or tasks are divided among the processors in a multi-processor system for execution in parallel.

In order to scale well as hardware performance gains are obtained through increased processor counts, applications can decompose available work into a large number of asynchronous operations or tasks. In task and data parallelism runtimes like the Parallel Extensions to the MICROSOFT®.NET Framework, an asynchronous operation is represented by a task object. Launching an asynchronous operation produces an instance of a task object that can be stored and waited on as an individual entity, meaning that any thread of execution that depends on the completion of the asynchronous operation represented by a task can block (i.e., pause processing) until the target task object finishes processing. The term "task" or "task object" as used herein is not intended to be limited to the MICROSOFT®.NET Framework, but rather is intended to cover in one embodiment any representation of an asynchronous operation or task in a parallel processing system.

The Windows operating system provides support for efficiently waiting on up to 64 wait handles, whether for a choice (i.e., "wait any") or for a join (i.e., "wait all"). This functionality is exposed to MICROSOFT®.NET developers through the WaitHandle.WaitAll and WaitHandle.WaitAny methods. When building a task-based system, efficient support for waiting on tasks to complete can be built on top of this functionality. However, given the fine-grained nature of tasks, it is often the case that more than 64 tasks will be created, thus hitting the limit imposed by the underlying Windows functionality. It is noted that other operating systems or environments may have different limits, and that the techniques described herein are not limited to the specifics of any one operating system. One embodiment provides the ability to wait on any number of tasks.

Figure 1:
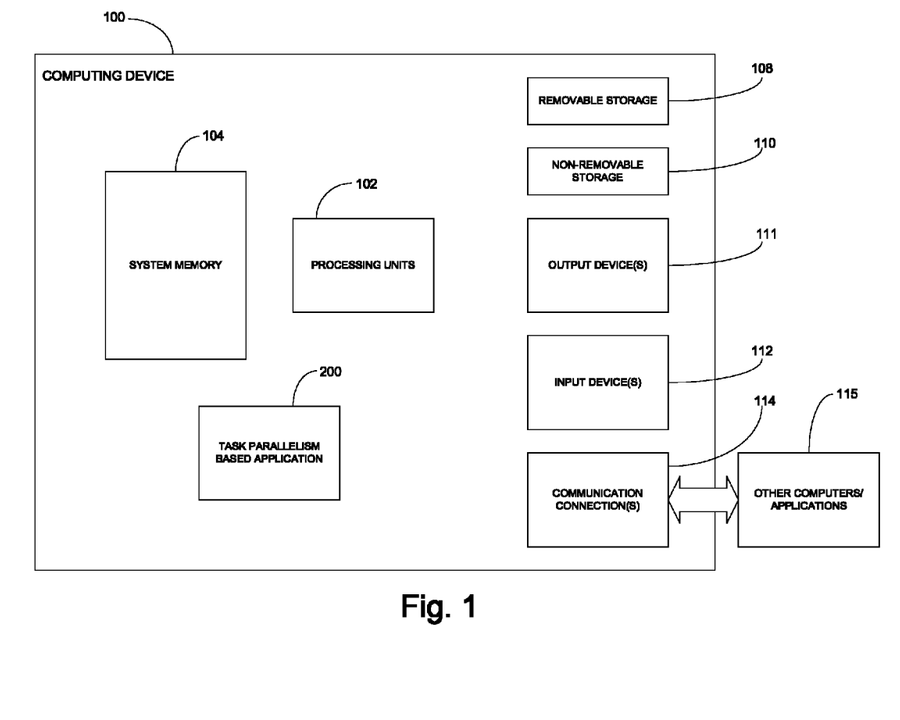
FIG. 1 is a diagram illustrating a computing device suitable for executing a task parallelism based application according to one embodiment.

FIG. 1 is a diagram illustrating a computing device 100 suitable for executing a task parallelism based application according to one embodiment. In the illustrated embodiment, the computing system or computing device 100 includes a plurality of processing units 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media (e.g., computer-readable storage media storing computer-executable instructions that when executed by at least one processor cause the at least one processor to perform a method). Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, and does not include transitory storage media. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes a task parallelism based application 200. Task parallelism based application 200 is described in further detail below with reference to FIG. 2.

Figure 2:
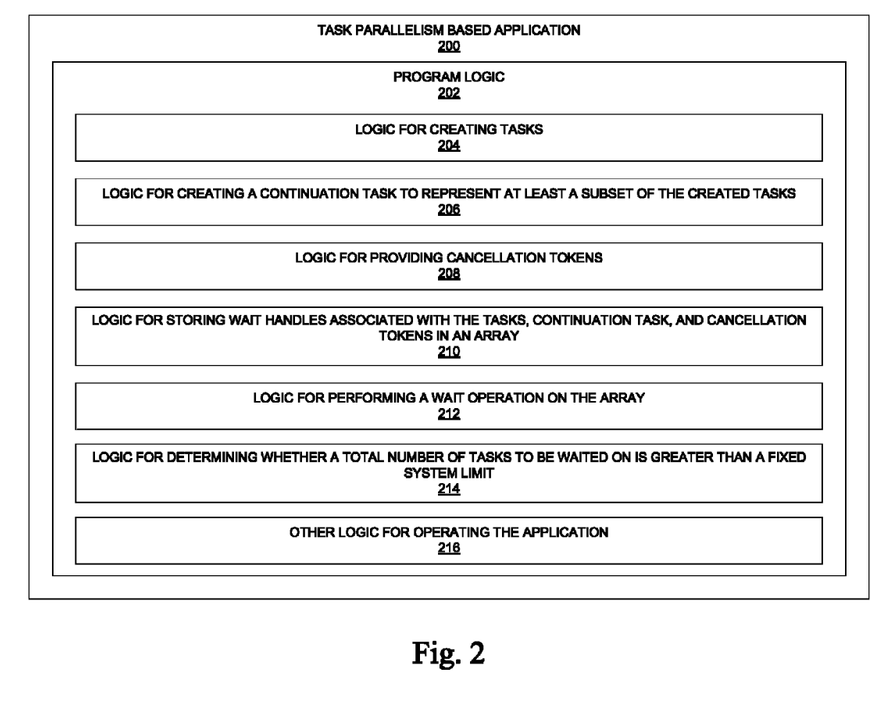
FIG. 2 is a diagrammatic view of a task parallelism based application for operation on the computing device illustrated in FIG. 1 according to one embodiment.

FIG. 2 is a diagrammatic view of a task parallelism based application 200 for operation on the computing device 100 illustrated in FIG. 1 according to one embodiment. Application 200 is one of the application programs that reside on computing device 100. However, application 200 can alternatively or additionally be embodied as computer-executable instructions on one or more computers (e.g., multiple computers in a networked configuration) and/or in different variations than illustrated in FIG. 1. Alternatively or additionally, one or more parts of application 200 can be part of system memory 104, on other computers and/or applications 115, or other such suitable variations as would occur to one in the computer software art.

Task parallelism based application 200 includes program logic 202, which is responsible for carrying out some or all of the techniques described herein. Program logic 202 includes logic 204 for creating tasks; logic 206 for creating a continuation task to represent at least a subset of the created tasks; logic 208 for providing cancellation tokens; logic 210 for storing wait handles associated with the tasks, continuation task, and cancellation tokens in an array; logic 212 for performing a wait operation on the array; logic 214 for determining whether a total number of tasks to be waited on is greater than a fixed system limit; and other logic 216 for operating the application.

Turning now to FIGS. 3-10, techniques for implementing one or more embodiments of application 200 are described in further detail. In some implementations, the techniques illustrated in FIGS. 3-10 are at least partially implemented in the operating logic of computing device 100.

Before describing FIGS. 3-10, some terms used in these figures and in the description of these figures will be discussed. A "continuation task" according to one embodiment refers to a mechanism in the Parallel Framework Extensions (PFX), and similar parallelism runtimes, by which the completion of a given task automatically triggers the spawning of a new task, which is the continuation. "ContinueWhenAll" according to one embodiment creates a Task which will only be scheduled when all of the specified tasks complete.

Figure 3:
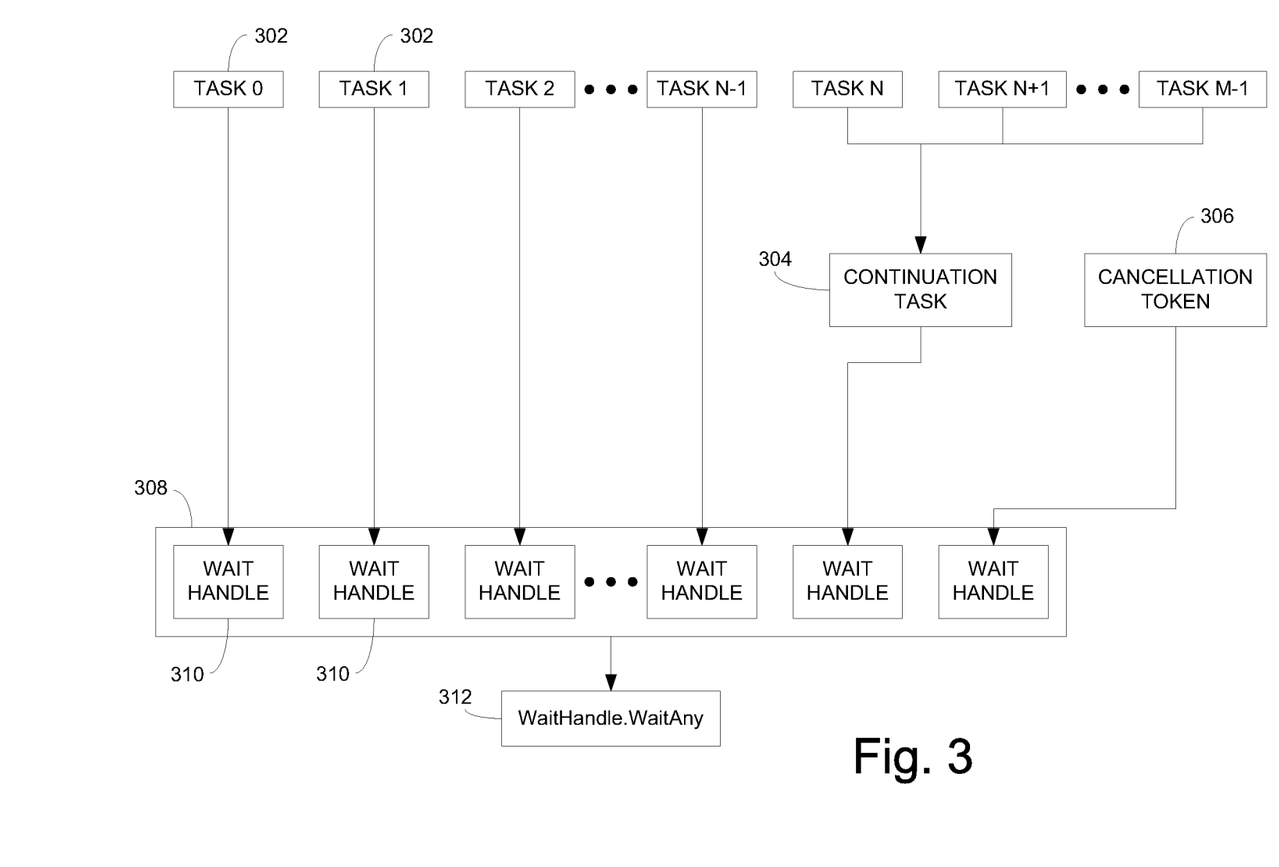
FIG. 3 is a diagram illustrating a wait any operation with cancellation according to one embodiment.

FIG. 3 is a diagram illustrating a wait any operation with cancellation according to one embodiment. In the Figures and in the following description, "M" represents the total number of tasks to be waited on; "NumSupportedWaitHandles" represents the total number of wait handles supported by the system (e.g., in one embodiment, NumSupportedWaitHandles=64); "ReservationCount" represents an amount that NumSupportedWaitHandles will be decreased in order to provide additional waiting and cancellation functionality; and "N" represents NumSupportedWaitHandles—ReservationCount.

As shown in FIG. 3, a plurality of tasks 302 are shown toward the top of the Figure. A wait handle 310 is used to represent each task 302, and the wait handle 310 is set when its corresponding task 302 is completed. The wait handles 310 are stored in an array 308. For Task.WaitAny, if more than the system-supported number of wait handles 310 is used, a WaitHandle.WaitAny method 312 is performed on the first N−1 wait handles 310. The first N−1 wait handles each represents an actual task 302. The Nth wait handle 310 represents a continuation task 304, which in turn represents the completion of any of the remaining (i.e., >N−1) tasks 302. The final wait handle 310 in array 308 represents a cancellation token 306. The WaitHandle.WaitAny method 312 is also performed on the wait handles 310 associated with the continuation task 304 and the cancellation token 306, so the WaitHandle.WaitAny method 312 waits for any of the tasks 302 to complete with cancellation support, as described in further detail below. The continuation task 304 according to one embodiment is a place holder for an externally-triggered cancellation request, and when triggered leads to the associated wait handle 310 being signaled.

An initial step for WaitAny and WaitAll according to one embodiment is to scan for already completed tasks. In one embodiment, WaitAny returns immediately if at least one completed task is found during the scan, and WaitAll skips the completed tasks from its subsequent processing. After this initial step for the wait any process shown in FIG. 3, a value for ReservationCount, which starts at "0" in one embodiment, is calculated. In one embodiment, if the number of tasks M is greater than NumSupportedWaitHandles, then ReservationCount is increased by 1. If cancellation may be requested (e.g., as expressed through a cancellation token 306 that exposes a wait handle 310 that is set when the token 306 has cancellation requested), then ReservationCount is increased by 1. In the embodiment shown in FIG. 3, the number of tasks M is greater than NumSupportedWaitHandles, and cancellation is supported, so the value for ReservationCount for this example would be two. Thus, the last two wait handles 310 in array 308 are reserved for the continuation task 304 and the cancellation token 306.

After the ReservationCount is calculated, the system scans through the supplied list of tasks 302 to wait on. If any of the tasks 302 has completed, the wait any operation is done, and the first task found as completed is returned. If none of the tasks 302 have completed, array 308 is created to hold the minimum of the number of tasks M and NumSupportedWaitHandles. The wait handles 310 representing the first N (i.e., N=NumSupportedWaitHandles−ReservationCount) tasks 302 are copied into the array 308.

If the number of tasks M is greater than N, a continuation task 304 is created for the remaining M−N tasks 302 to return the index of any of those tasks 302 that completed when the continuation task 304 completes. In one embodiment, the continuation task 304 is a multi-task continuation that is implemented by registering a continuation with each individual task 302 that it represents, which will signal the continuation as completed and return the index of the completed task 302. A wait handle 310 representing this continuation task 304 is added to the array 308. If cancellation may be requested, a wait handle 310 representing the relevant cancellation token 306 is also added to the array 308.

After all of the relevant wait handles 310 have been added to the array 308, the WaitHandle.WaitAny method 312 is used to wait on the array 308. In one embodiment, one of four actions is taken after the WaitHandle.WaitAny method 312 completes: (1) If the wait handle 310 for the cancellation token 306 was set due to cancellation being requested, an operation canceled exception is thrown; (2) if the WaitAny call signaled that the call completed due to one of the wait handles 310 for one of the first N tasks 302, the system returns immediately informing the caller which task 302 caused the completion; (3) if the WaitHandle.WaitAny call signaled that the call completed due to the wait handle 310 of the continuation task 304 being set, the system returns immediately informing the user which task 302 caused the completion, as identified by the return value of the continuation task 304; and (4) if the WaitHandle.WaitAny call signaled that the call completed due to a user-supplied timeout expiring, the system returns immediately informing the user of the timeout.

In one embodiment, Task.WaitAny support is provided by directly waiting on the wait handles 310 for a subset of the tasks 302 along with a wait handle 310 that represents a continuation task 304 for the remainder of the tasks 302 (and optionally a wait handle 310 for a cancellation token 306). This provides efficient waiting for a number of wait handles 310 (i.e., up to whatever is supported in WaitHandle.WaitAny, or its equivalent provided by the underlying platform). After that, the cost of Task.WaitAny is increased only incrementally for each additional task 302 above that number.

Figure 4:
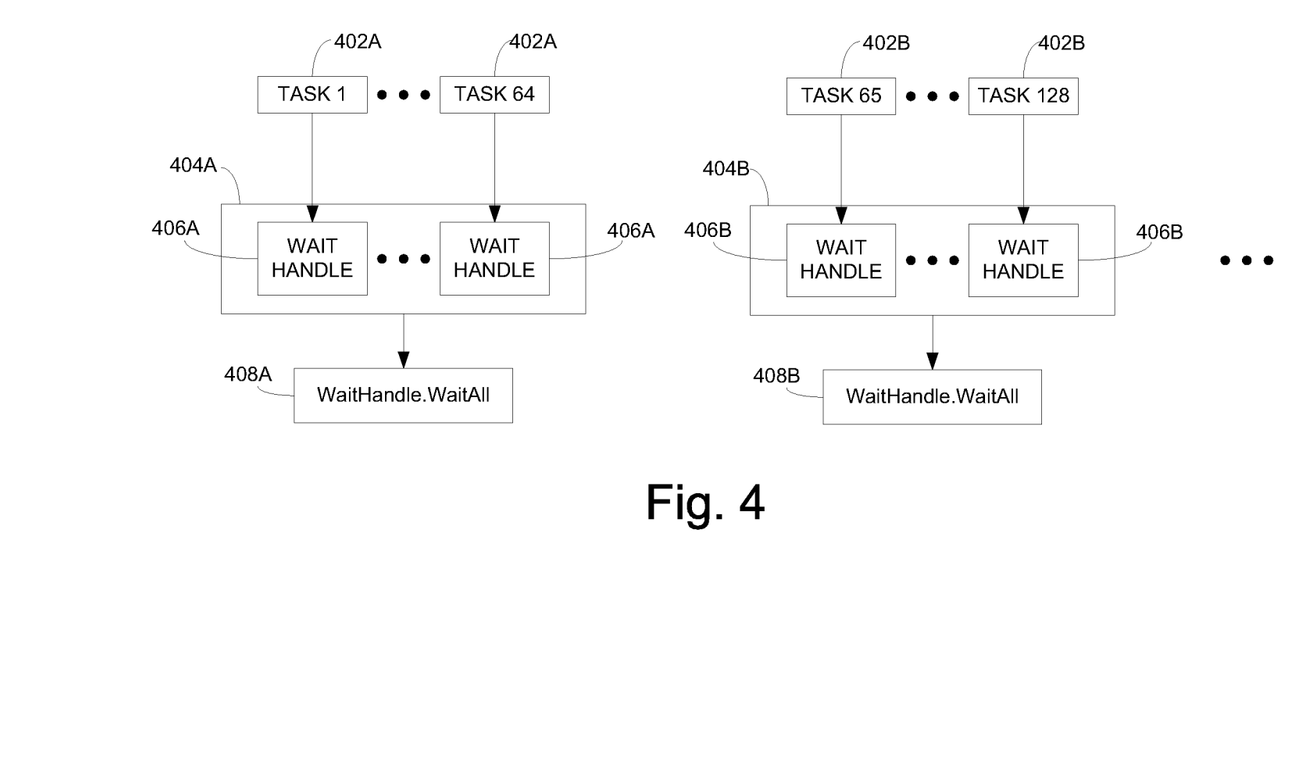
FIG. 4 is a diagram illustrating a wait all operation without cancellation according to one embodiment.

FIG. 4 is a diagram illustrating a wait all operation without cancellation according to one embodiment. As shown in FIG. 4, a plurality of tasks 402A and 402B are shown toward the top of the Figure. A wait handle 406A or 406B is used to represent each task 402A or 402B, and the wait handle 406A or 406B is set when its corresponding task 402A or 402B is completed. The wait handles 406A are stored in an array 404A, and the wait handles 406B are stored in an array 404B. For Task.WaitAll, if more than the system-supported number of wait handles 406A is used, the tasks are grouped into groups of up to NumSupportedWaitHandles tasks, and the system-provided WaitHandle.WaitAll method is used to wait on each group in turn. Once all groups have been waited on, the wait operation completes. In the example shown in FIG. 4, two groups of tasks 402A and 402B are shown, and it is assumed that NumSupportedWaitHandles equals 64. The first 64 tasks are represented by reference number 402A, and the next 64 tasks are represented by reference number 402B. Additional tasks may also be waited on by using more than two groups. In the illustrated embodiment, after the WaitHandle.WaitAll method 408A is done waiting on the first 64 tasks 402A, the WaitHandle.WaitAll method 408B is performed on the next 64 tasks 402B. This process continues until all of the supplied tasks have been waited on.

In one embodiment, prior to grouping the tasks 402A and 402B as shown in FIG. 4, all of the supplied tasks are first iterated through. If a task has not already completed, an attempt is made to "inline" the task, meaning to run it to completion on the current thread rather than to wait for it to complete on another thread. If the task has still not completed after that inlining attempt, the task is added onto a completions list. If the completions list is empty, the wait operation completes immediately. If more than the system-supported number of tasks remain in the completions list, these tasks are then grouped as described above.

Figure 5:
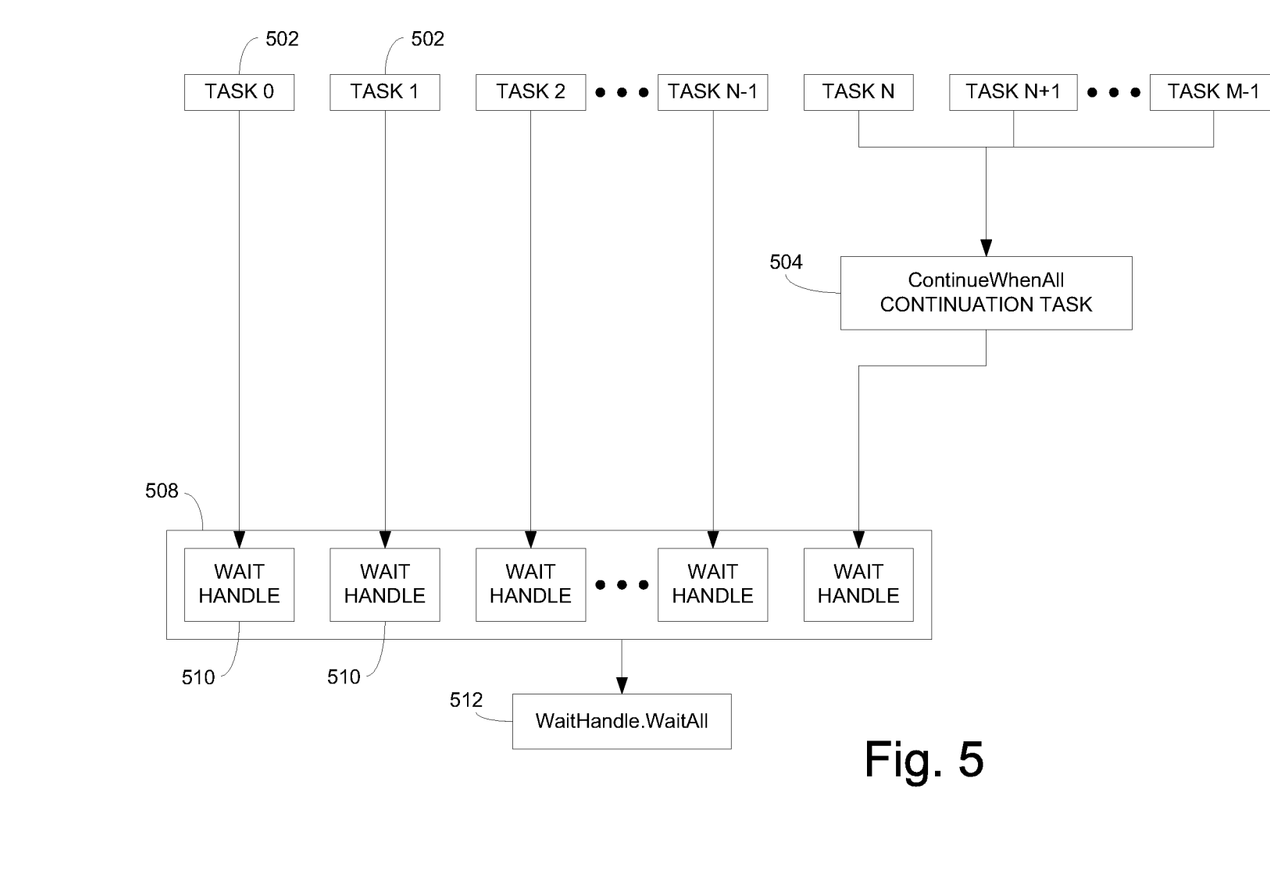
FIG. 5 is a diagram illustrating a wait all operation without cancellation according to another embodiment.

FIG. 5 is a diagram illustrating a wait all operation without cancellation according to another embodiment. As shown in FIG. 5, a plurality of tasks 502 are shown toward the top of the Figure. A wait handle 510 is used to represent each task 502, and the wait handle 510 is set when its corresponding task 502 is completed. The wait handles 510 are stored in an array 508. For Task.WaitAll, if more than the system-supported number of wait handles 510 is used, a WaitHandle.WaitAll method 512 is performed on the first N−1 wait handles 510. The first N−1 wait handles each represents an actual task 502. The Nth wait handle 510 represents a ContinueWhenAll continuation task 504, which in turn represents the completion of all of the remaining tasks 502. The WaitHandle.WaitAll method 512 is also performed on the wait handle 510 associated with the continuation task 504, so the WaitHandle.WaitAll method 512 waits for all of the tasks 502 to complete. In one embodiment, the tasks 502 associated with the continuation task 504 are each configured to decrement a counter when each task completes. The counter starts at a value corresponding to the number of tasks 502 associated with the continuation task 504, and the last task 502 to decrement the counter (e.g., decrement the counter to zero) signals the continuation task 504 to run, which in turn signals the Nth wait handle in array 508. Thus, the continuation task 504 runs when all of the tasks 502 associated with the continuation task 504 have completed.

Figure 6:
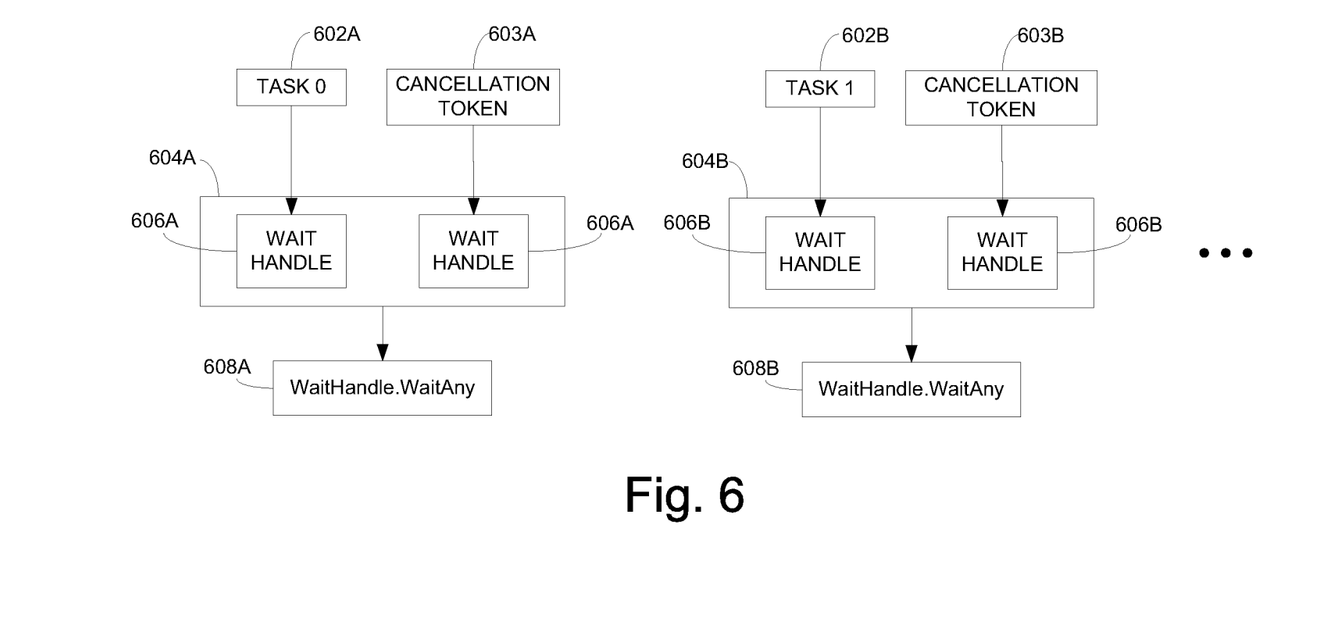
FIG. 6 is a diagram illustrating a wait all operation with cancellation according to one embodiment.

FIG. 6 is a diagram illustrating a wait all operation with cancellation according to one embodiment. As shown in FIG. 6, tasks 602A and 602B are shown toward the top of the Figure. Wait handles 606A and 606B are used to represent tasks 602A and 602B, respectively, and the wait handle 606A or 606B is set when its corresponding task is completed. The wait handle 606A is stored in an array 604A, and the wait handle 606B is stored in an array 604B. A cancellation token is provided for each task. As shown in FIG. 6, cancellation token 603A is associated with task 602A and cancellation token 603B is associated with task 602B. A wait handle 606A for cancellation token 603A is stored in array 604A, and a wait handle 606B for cancellation token 603B is stored in array 604B. The wait handle 606A or 606B is set when its associated cancellation token 603A or 603B has cancellation requested.

For each task in turn, the WaitHandle.WaitAny method is used to wait for either the task's or the cancellation token's wait handle to be signaled. This process continues until a cancellation or timeout occurs, or until the last task completes. In the example shown in FIG. 6, the WaitHandle.WaitAny method 608A is used to wait for the wait handle 606A for task 602A to complete or for the wait handle 606A for cancellation token 603A to complete, and then the WaitHandle.WaitAny method 608B is used to wait for the wait handle 606B for task 602B to complete or for the wait handle 606B for cancellation token 603B to complete. If the wait handle for a cancellation token completes, an operation canceled exception is thrown. If the WaitAny times out due to a user-supplied timeout (the "remaining time" on the timeout is adjusted for each wait operation based on the time taken by the previous wait operation), the wait operation completes to notify the user of the timeout.

Figure 7:
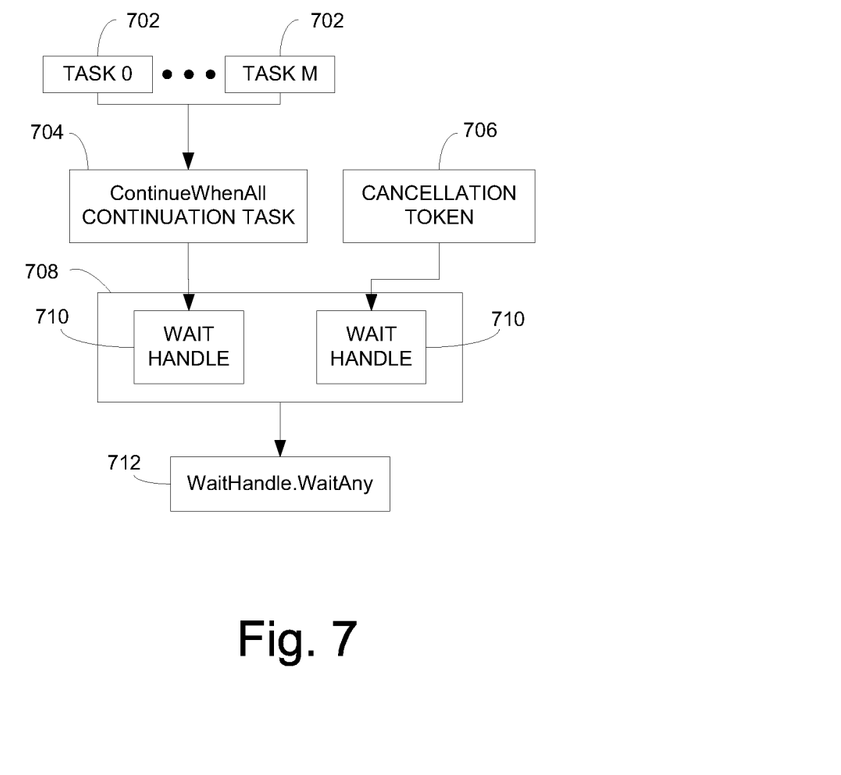
FIG. 7 is a diagram illustrating a wait all operation with cancellation according to another embodiment.

FIG. 7 is a diagram illustrating a wait all operation with cancellation according to another embodiment. As shown in FIG. 7, a plurality of tasks 702 are shown toward the top of the Figure. A ContinueWhenAll continuation task 704 represents the completion of all of the tasks 702. A wait handle 710 corresponding to continuation task 704 is stored in array 708. A cancellation token 706 includes an associated wait handle 710, which is stored in array 708 and is set when the cancellation token 706 has cancellation requested. For Task.WaitAll, the WaitHandle.WaitAny method 712 is performed on array 708 to wait for all of the tasks 702 to complete with cancellation support. In one embodiment, the tasks 702 are each configured to decrement a counter when the task completes. The counter starts at a value corresponding to the total number of tasks 702, and the last task 702 to decrement the counter (e.g., decrement the counter to zero) signals the continuation task 704 to run. Thus, the continuation task 704 runs when all of the tasks 702 have completed. The wait all operation shown in FIG. 7 can be implemented without cancellation support by waiting on the continuation task 704 without using the cancellation token 706 and its associated wait handle 710.

Figure 8:
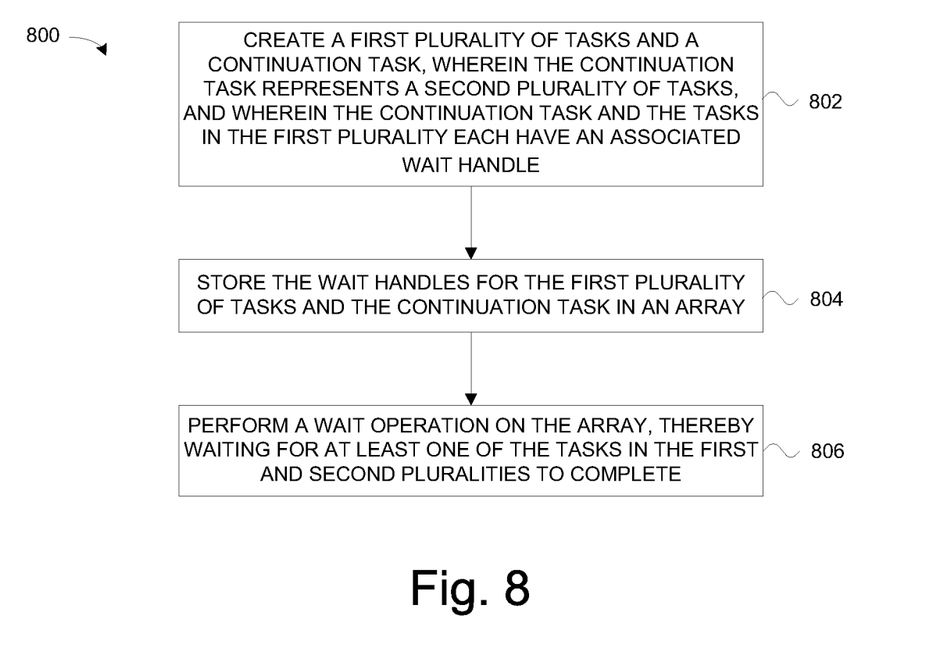
FIG. 8 is a flow diagram illustrating a method of performing a wait operation according to one embodiment.

FIG. 8 is a flow diagram illustrating a method 800 of performing a wait operation according to one embodiment. At 802 in method 800, a first plurality of tasks and a continuation task are created, wherein the continuation task represents a second plurality of tasks, and wherein the continuation task and the tasks in the first plurality each have an associated wait handle. At 804, the wait handles for the first plurality of tasks and the continuation task are stored in an array. At 806, a wait operation is performed on the array, thereby waiting for at least one of the tasks in the first and second pluralities to complete. In one embodiment, the creating (802), storing (804), and performing (806) are performed by at least one processor.

In one embodiment of method 800, the tasks in the first and second pluralities represent asynchronous operations that are configured to be executed in a parallel manner by a plurality of processors. The wait operation in method 800 according to one embodiment waits for any of the tasks in the first and second pluralities to complete. The wait operation in method 800 according to another embodiment waits for all of the tasks in the first and second pluralities to complete. In one embodiment, a wait handle for a cancellation token is also stored in the array. In one embodiment of method 800, performing the wait operation on the array results in an operation canceled exception being thrown when the wait handle for the cancellation token is set. Method 800 according to one embodiment further includes determining whether a total number of tasks to be waited on is greater than a fixed system limit, and creating the continuation task in response to a determination that the total number of tasks to be waited on is greater than the fixed system limit.

Figure 9:
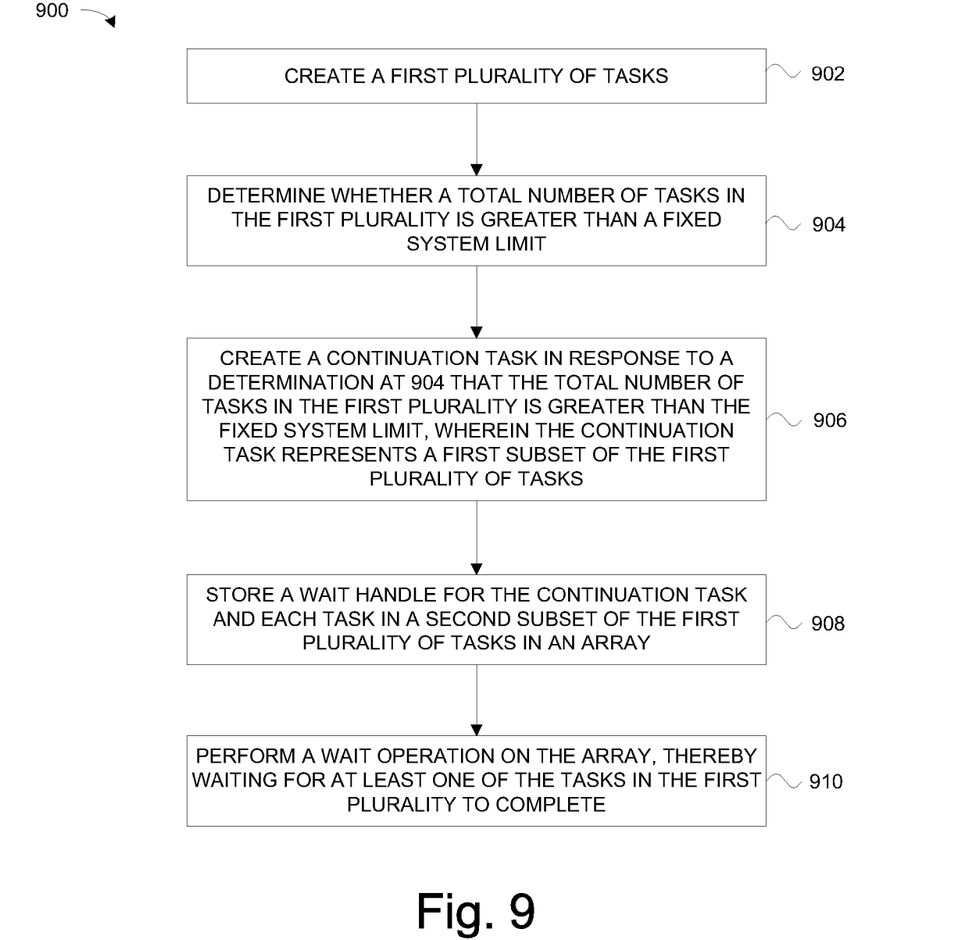
FIG. 9 is a flow diagram illustrating a method of performing a wait operation according to another embodiment.

FIG. 9 is a flow diagram illustrating a method 900 of performing a wait operation according to another embodiment. At 902 in method 900, a first plurality of tasks is created. At 904, it is determined whether a total number of tasks in the first plurality is greater than a fixed system limit. At 906, a continuation task is created in response to a determination at 904 that the total number of tasks in the first plurality is greater than the fixed system limit, wherein the continuation task represents a first subset of the first plurality of tasks. At 908, a wait handle for the continuation task and each task in a second subset of the first plurality of tasks are stored in an array. At 910, a wait operation is performed on the array, thereby waiting for at least one of the tasks in the first plurality to complete. In one embodiment, the creating a first plurality of tasks (902), determining (904), creating a continuation task (906), storing (908), and performing (910) are performed by at least one processor.

In one embodiment of method 900, the tasks in the first plurality represent asynchronous operations that are configured to be executed in a parallel manner by a plurality of processors. The wait operation in method 900 according to one embodiment waits for any of the tasks in the first plurality to complete. The wait operation in method 900 according to another embodiment waits for all of the tasks in the first plurality to complete. In one embodiment, a wait handle for a cancellation token is also stored in the array. In one embodiment of method 900, performing the wait operation on the array results in an operation canceled exception being thrown when the wait handle for the cancellation token is set.

Figure 10:
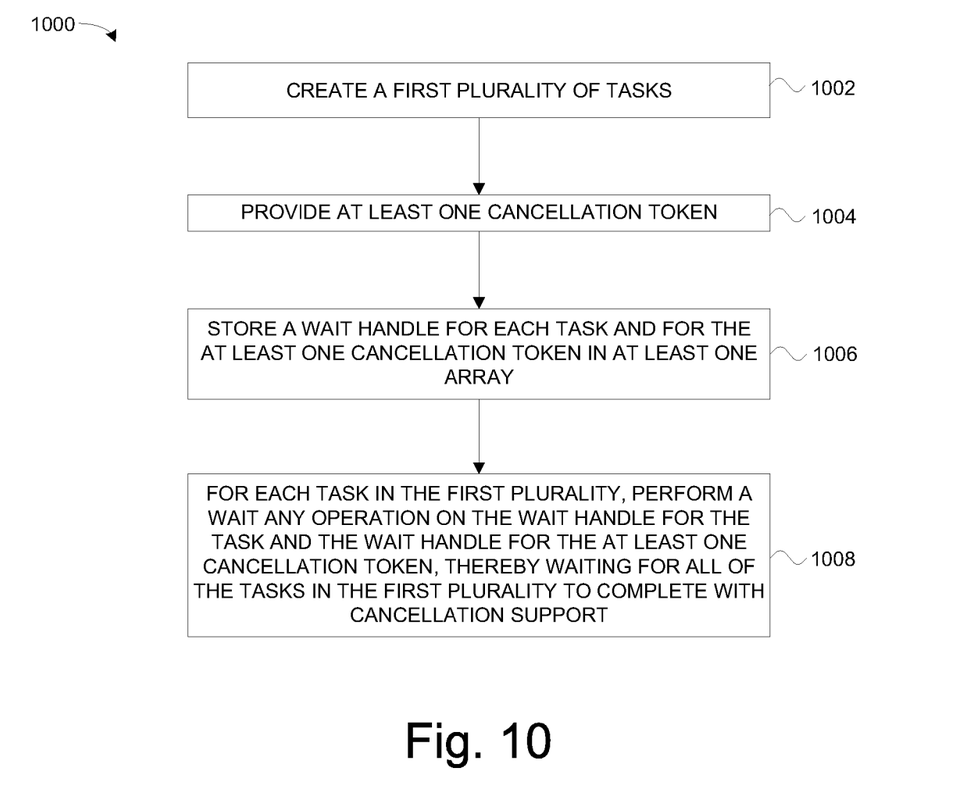
FIG. 10 is a flow diagram illustrating a method of performing a wait all operation according to one embodiment.

FIG. 10 is a flow diagram illustrating a method 1000 of performing a wait all operation according to one embodiment. At 1002 in method 1000, a first plurality of tasks is created. At 1004, at least one cancellation token is provided. At 1006, a wait handle for each task and for the at least one cancellation token are stored in at least one array. At 1008, for each task in the first plurality, a wait any operation is performed on the wait handle for the task and the wait handle for the at least one cancellation token, thereby waiting for all of the tasks in the first plurality to complete with cancellation support. In one embodiment, the creating (1002), providing (1004), storing (1006), and performing (1008) are performed by at least one processor.

In one embodiment of method 1000, the tasks in the first plurality represent asynchronous operations that are configured to be executed in a parallel manner by a plurality of processors. In one embodiment, performing the wait any operation at 1008 results in an operation canceled exception being thrown when the wait handle for at least one cancellation token is set.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of performing a wait operation, comprising:
creating a first plurality of tasks and a continuation task, the continuation task representing a second plurality of tasks, the continuation task and the tasks in the first plurality each having an associated wait handle, wherein the continuation task representing the second plurality of tasks is automatically created in response to a determination that a total number of tasks in the first and second pluralities is greater than a fixed system limit;
storing the wait handles for the first plurality of tasks and the continuation task in an array without storing a wait handle for any task in the second plurality in the array;
performing a wait operation on the array to wait for at least one of the tasks in both of the first and second pluralities to complete; and
wherein the creating, storing, and performing are performed by at least one processor.

2. The method of claim 1, wherein the tasks in the first and second pluralities represent asynchronous operations that are configured to be executed in a parallel manner by a plurality of processors.

3. The method of claim 1, wherein the wait operation waits for any of the tasks in the first and second pluralities to complete.

4. The method of claim 1, wherein the wait operation waits for all of the tasks in the first and second pluralities to complete.

5. The method of claim 4, and further comprising:
inlining at least one of the tasks in the first plurality by running the at least one task to completion on a current thread rather than waiting for the at least one task to complete on another thread.

6. The method of claim 1, and further comprising:
storing a wait handle for a cancellation token in the array.

7. The method of claim 6, wherein performing the wait operation on the array results in an operation canceled exception being thrown when the wait handle for the cancellation token is set.

8. The method of claim 1, and further comprising:
determining whether a total number of tasks to be waited on is greater than a fixed system limit.

9. The method of claim 8, and further comprising:
creating the continuation task in response to a determination that the total number of tasks to be waited on is greater than the fixed system limit.

10. The method of claim 9, and further comprising:
decrementing a counter with each task in the second plurality when the task completes; and
signaling the continuation to run with a last task to decrement the counter.

11. A computer-readable storage medium storing computer-executable instructions that when executed by at least one processor cause the at least one processor to perform a method of performing a wait operation, the method comprising:
creating a first plurality of tasks;
determining whether a total number of tasks in the first plurality is greater than a fixed system limit;
creating a continuation task in response to a determination that the total number of tasks in the first plurality is greater than the fixed system limit, the continuation task representing a first subset of the first plurality of tasks;
storing a wait handle for the continuation task and each task in a second subset of the first plurality of tasks in an array without storing a wait handle for any task in the first subset in the array; and
performing a wait operation on the array to wait for at least one of the tasks in both of the first and second subsets of the first plurality to complete.

12. The computer-readable storage medium of claim 11, wherein the tasks in the first plurality represent asynchronous operations that are configured to be executed in a parallel manner by a plurality of processors.

13. The computer-readable storage medium of claim 11, wherein the wait operation waits for any of the tasks in the first plurality to complete.

14. The computer-readable storage medium of claim 11, wherein the wait operation waits for all of the tasks in the first plurality to complete.

15. The computer-readable storage medium of claim 11, wherein the method further comprises:
storing a wait handle for a cancellation token in the array.

16. The computer-readable storage medium of claim 15, wherein performing the wait operation on the array results in an operation canceled exception being thrown when the wait handle for the cancellation token is set.

17. A method of performing a wait all operation, comprising:
creating a first plurality of tasks;
providing at least one cancellation token for each task in the first plurality of tasks;
storing a wait handle for each task and for the at least one cancellation token in at least one array;
for each task in the first plurality, performing a wait any operation on both the wait handle for the task and the wait handle for the at least one cancellation token to wait for any of completion of the task or cancellation, wherein performing the wait any operation for each task in the first plurality results in waiting for all of the tasks in the first plurality to complete with cancellation support; and
wherein the creating, providing, storing, and performing are performed by at least one processor.

18. The method of claim 17, wherein the tasks in the first plurality represent asynchronous operations that are configured to be executed in a parallel manner by a plurality of processors.

19. The method of claim 17, wherein performing the wait any operation results in an operation canceled exception being thrown when the wait handle for the at least one cancellation token is set.

* * * * *